US006400953B1

(12) United States Patent
Furukawa

(10) Patent No.: US 6,400,953 B1
(45) Date of Patent: *Jun. 4, 2002

(54) CDMA TYPE MOBILE RADIO COMMUNICATION SYSTEM CAPABLE OF REALIZING AN EFFECTIVE SYSTEM OPERATION WITHOUT EXCESS AND DEFICIENCY OF RADIO BASE STATIONS SIMULTANEOUSLY CONNECTED

(75) Inventor: Hiroshi Furukawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 30 days.

(21) Appl. No.: 09/087,080

(22) Filed: May 29, 1998

(30) Foreign Application Priority Data

Aug. 11, 1997 (JP) .............................. 9-216408

(51) Int. Cl.[7] .............................. H04Q 7/20
(52) U.S. Cl. ...................... 455/442; 455/436; 370/332; 370/335
(58) Field of Search .............................. 370/320, 331, 370/332, 333, 335; 455/436, 437, 440, 441, 442, 443, 444

(56) References Cited

U.S. PATENT DOCUMENTS

| 5,140,695 | A | * | 8/1992 | Yasuda et al. ............... 455/441 |
| 5,239,667 | A | * | 8/1993 | Kanai .......................... 455/10 |
| 5,267,261 | A | * | 11/1993 | Blakeney, II et al. ........... 375/1 |
| 5,396,645 | A | * | 3/1995 | Huff ......................... 455/33.4 |
| 5,432,842 | A | * | 7/1995 | Kinoshita et al. ........... 455/436 |
| 5,436,956 | A | | 7/1995 | Shiotsuki et al. |
| 5,450,473 | A | * | 9/1995 | Shiotsuki et al. ........... 455/441 |
| 5,491,834 | A | * | 2/1996 | Chia ........................ 455/33.2 |
| 5,754,945 | A | * | 5/1998 | Lin et al. .................... 455/436 |
| 5,812,540 | A | * | 9/1998 | Bruckert et al. ............ 370/332 |
| 5,930,721 | A | * | 7/1999 | Fried et al. ................. 455/466 |
| 5,995,836 | A | * | 11/1999 | Wijk et al. .................. 455/436 |

FOREIGN PATENT DOCUMENTS

| CA | 2197857 | 2/1996 |
| EP | 0 631 451 A2 | 12/1994 |
| EP | 0 660 627 A2 | 6/1995 |
| GB | 2 274 228 A | 7/1994 |
| WO | WO 97/21318 | 6/1997 |
| WO | WO 98/20640 | 5/1998 |

OTHER PUBLICATIONS

A. Salmasi et al., "On the System Design Aspects of Code Division Multiple Access (CDMA) Applied to Digital Cellular and Personal Communications Networks", IEEE Vehicular Technology Conference, May 1991, pp. 57–62.

* cited by examiner

Primary Examiner—Nay Maung
(74) Attorney, Agent, or Firm—Sughrue, Mion, Zinn, Macpeak & Seas, PLLC

(57) ABSTRACT

In a code division multiple access (CDMA) cellular type mobile radio communication system, in order to realize effective system operation with neither more nor less of radio base stations which are simultaneously communicated with a mobile station on carrying out soft handoff, it is possible for the mobile station to communicate with the radio base stations having proper numbers in accordance with propagation environment and a moving speed of the mobile station by changing threshold levels for selection of the radio base stations and a hysteresis margin therefor on the basis of a variation rate in a propagation loss estimated by a reception level of a pilot signal.

48 Claims, 10 Drawing Sheets

CDMA TYPE MOBILE RADIO COMMUNICATION SYSTEM CAPABLE OF REALIZING AN EFFECTIVE SYSTEM OPERATION WITHOUT EXCESS AND DEFICIENCY OF RADIO BASE STATIONS SIMULTANEOUSLY CONNECTED

BACKGROUND OF THE INVENTION

This invention relates to a mobile communication system and, in particular, to a method of selecting radio base stations in a mobile station of a code division multiple access (CDMA) cellular type mobile radio communication system in which the mobile station is simultaneously connected with the the radio base stations.

As is well known in the art, various multiple access types have been adapted in a mobile radio communication system. One of the multiple access type is a CDMA cellular type. The CDMA cellular type mobile radio communication system assigns to each channel with a particular code, transmits to the same repeater a modulated wave to which a carrier having the same carrier frequency is spectrum-spread with the code, establishes code synchronization in each receiving side, and identifies a desired channel. The CDMA cellular type mobile radio communication system may be called a SSMA (spread spectrum multiple access) cellular type mobile radio communication system.

The CDMA type mobile communication system comprises a plurality of mobile stations and a plurality of radio base stations each of which serves as a repeater. Each radio base station is called a base transceiver station in the art. In addition, each mobile station is referred to as a terminal. As described above, inasmuch as the plurality of mobile station carry out communication using the carrier with the same carrier frequency, it is necessary for the CDMA type mobile radio communication system to be uniform reception energy of an upward communication channel from each mobile station communicating with the radio base station without a position of the mobile station.

In order to be uniform the reception energy in the radio base station, the CDMA type mobile radio communication system carries out transmission power control for the upward communication channel as described in TIA (Telecommunication Industry Association)/EIA (Electronic Industries Association)/IS-95.

The CDMA cellular type mobile radio communication system comprises a plurality of radio base stations which are unevenly distributed and which simultaneously use a carrier having the same carrier frequency. In the CDMA cellular type mobile radio communication system, a mobile station must always connect with the radio base station having the minimum propagation loss and must suppress interference in other radio channels so as to minimize by carrying out transmission power control. Throughout the specification, the term "connect" or "connection" means a state where a transmission path is established in order to carry out communication between the mobile station and the radio base station. Inasmuch as connection processing to a new radio base station takes a certain time, the radio base station having the minimum propagation loss is taken turns in dependency on variation of the propagation loss during this period and there is a case where a radio base station of a destination to be switched is affected by interference.

Description will proceed to the interference to the radio base station of the destination to be changed that occurs on connection processing to the above-mentioned new radio base station.

It is assumed that a mobile station connected to a first radio base station moves to a zone or a cell which is covered by a second radio base station. Under the circumstances, the mobile station starts switching processing for the radio base stations at a time when a difference between the propagation losses for the first and the second radio base stations is less than a connection threshold level. In addition, the mobile station carries out transmission power control for the first radio base station for a connection processing time interval.

When the propagation loss fox the second radio base station is less than that for the first radio base station during the connection processing time interval, the mobile station influences the interference for the second radio base station having a less propagation loss than that of the first base station. This is because the mobile station carries out the transmission power control for the first radio base station.

In order to overcome the above-mentioned interference problem due to this connection processing, a method is disclosed an article which is contributed by Allen Salmasi et al. to Proceeding in IEEE Vehicular Technology Conference, pages 57–62, May 1991, under the title of "ON THE SYSTEM DESIGN ASPECTS OF CODE DIVISION MULTIPLE ACCESS (CDMA) APPLIED TO DIGITAL CELLULAR AND PERSONAL COMMUNICATIONS NETWORKS." The method described in the above-mentioned reference is called a soft handoff or a soft handover. The soft handoff uses a technique which has ready for variation of the propagation loss by simultaneously connecting a mobile station with a plurality of radio base stations which include not only the radio base station having the minimum propagation loss but also a radio base station candidate which may come to have minimum pass loss hereafter.

Description will proceed to the soft handoff in a conventional CDMA cellular type mobile radio communication system. It is assumed that a mobile station connected to a first radio base station moves to a zone or a cell covered by a second radio base station. Under the circumstances, the mobile station starts connection processing for the second radio base station with connection of the first radio base station held at a time when a difference between the propagation losses for the first and the second radio base stations is less than a connection threshold level When connection processing for the second radio base station completes after the lapse of the connection processing time interval, connection of the first and the second radio base stations starts. Inasmuch as the transmission power control for the radio base station having the minimum propagation loss is always carried out during simultaneous connection, the issue related to the interference for the second radio base station dies although that issue does not die in a hard handoff method described above. Thereafter, connection of the first radio base station is released or disconnected at a time when the difference between the propagation losses of the first and the second radio base stations is more than a disconnection threshold level. In the manner which is described above, by carrying out the simultaneous connection of the radio base stations whose propagation loss levels are immediate, it is possible to cope with alternation of the radio base station having the minimum propagation loss and to suppress the interference.

The connection threshold level and the disconnection threshold level are set so that the latter is higher than the former. A difference between the connection threshold level and the disconnection threshold level is referred to as a hysteresis margin. That is, the hysteresis margin defines release from connection of the radio base stations. The hysteresis margin is prepared in order to prevent switching of connection and disconnection of the radio base stations from occurring frequently in a case where the difference between the propagation losses of the radio base stations varies heavily in the vicinity of the threshold level. The higher the connection threshold level and the disconnection threshold level become, the larger the number of the radio base stations simultaneously connected is.

However, a rate and a magnitude of variation in the propagation loss from the mobile station to each radio base station varies in accordance with a moving speed of the mobile station and circumferential propagation environment. For instance, the propagation loss extremely varies in cities where buildings are in close order so far as the mobile station moves slightly. This is because there are many objects which cut off paths for propagation of radio waves in the cities. In other words, in the cities, the variation of the propagation loss is fast and the magnitude thereof is large. On the other hand, in the suburbs of the cities, the variation of the propagation loss is slow and the magnitude thereof is small. This is because there are a few objects which cut off paths for propagation of radio waves in the suburbs.

In the above-mentioned conventional methods for selecting radio base stations, the threshold level for the propagation loss always has a constant level disregarding the circumferential propagation environment. However, it is necessary in an area where the variation of the propagation loss is fast such as the cities to set the threshold level for the propagation loss to be high in order to cope with rapid variation of the propagation loss. Otherwise, connection of the radio base station having the minimum propagation loss is late and it results in inflicting the interference upon the radio base station in question. On the other hand, in the suburbs where the variation of the propagation loss is slow, it is possible to set the threshold level for the propagation loss to be low. In other words, it is difficult to realize effective system operation in a case of using a fixed threshold level for the propagation loss. This is because excess and deficiency of the radio base stations simultaneously connected occur.

In addition, the hysteresis margin may be set to be small in a case where the variation of the propagation loss is slow. This is because the switching of the connection and the disconnection does not occur frequently. Conversely, if unnecessary large hysteresis margin is set, connection of useless radio base stations is maintained and it results in obstructing the effective system operation.

SUMMARY OF THE INVENTION

It is therefore an object of the present invention to provide a radio base station selecting method which is capable of realizing an effective system operation without excess and deficiency of the radio base stations simultaneously connected.

Other objects of this invention will become clear as the description proceeds.

According to an aspect of this invention, a method is for selecting radio base stations in a mobile station of a code division multiple access (CDMA) cellular type mobile radio communication system. The method comprises the steps of selecting the radio base stations to be connected so as to become more when a level of propagation loss changes rapidly, and of selecting the radio base stations to be connected so as to become less when the level of the propagation loss changes slowly.

According to another aspect of this invention, a method is for setting a hysteresis margin in a mobile station of a code division multiple access (CDMA) cellular type mobile radio communication system comprising a plurality of radio base stations. The hysteresis margin defines release from connection of said radio base stations. The method comprises the steps of setting the hysteresis margin so as to become larger when a level of propagation loss changes rapidly, and of setting the hysteresis margin so as to become smaller when the level of the propagation loss changes slowly.

According to still another aspect of this invention, a method is for selecting radio base stations in a mobile station of a code division multiple access (CDMA) cellular type mobile radio communication system, The method comprises the steps of selecting the radio base stations to be connected so as to become more when a moving speed of the mobile station is fast, and of selecting the radio base stations to be connected so as to become less when the moving speed of the mobile station is slow.

According to yet another aspect of this invention, a method is for setting a hysteresis margin in a mobile station of a code division multiple access (CDMA) cellular type mobile radio communication system comprising a plurality of radio base stations. The hysteresis margin defines release from connection of the radio base stations. The method comprises the steps of setting the hysteresis margin so as to become larger when a moving speed of the mobile station is fast, and of setting the hysteresis margin so as to become smaller when the moving speed of the mobile station is slow.

According to an aspect of this invention, a code division multiple access (CDMA) cellular type mobile radio communication system comprises a plurality of radio base stations and at least one mobile station. The mobile station comprises a propagation loss measurement unit for measuring a propagation loss from the mobile station to each of the radio base stations. Connected to the propagation loss measurement unit, a soft handoff radio base station selection unit determines the radio base stations to be connected or to be disconnected on the basis of the propagation loss. The soft handoff radio base station selection unit selects the radio base stations to be connected so as to become more when a level of the propagation loss changes rapidly. The soft handoff radio base station selection unit selects the radio base stations to be connected so as to become less when the level of the propagation loss changes slowly.

According to another aspect of this invention, a code division multiple access (CDMA) cellular type mobile radio communication system comprises a plurality of radio base stations and at least one mobile station. The mobile station comprises a propagation loss measurement unit for measuring a propagation loss from the mobile station to each of the radio base stations. Connected to the propagation loss measurement unit, a soft handoff radio base station selection unit determines the radio base stations to be connected or to be disconnected on the basis of the propagation loss with reference to a connection threshold level and a disconnection threshold level which is higher than the connection threshold level by a hysteresis margin. The soft handoff radio base station selection unit sets the hysteresis margin so as to become larger when a level of the propagation loss changes rapidly. The soft handoff radio base station selection unit sets the hysteresis margin so as to become smaller when the level of the propagation loss changes slowly.

According to still another object of this invention, a code division multiple access (CDMA) cellular type mobile radio communication system comprises a plurality of radio base stations and at least one mobile station. The mobile station comprises a propagation loss measurement unit for measuring a propagation loss from the mobile station to each of the radio base stations and a moving speed detection unit for detecting a moving speed of the mobile station. Connected to the propagation loss measurement unit and the moving speed detection unit, a soft handoff radio base station selection unit determines the radio base stations to be connected or to be disconnected on the basis of the propagation loss. The soft handoff radio base station selection unit selects the radio base stations to be connected so as to become more when the moving speed is fast. The soft handoff radio base station selection unit selects the radio base stations to be connected so as to become less when the moving speed is slow.

According to yet another object of this invention, a code division multiple access (CDMA) cellular type mobile radio communication system comprises a plurality of radio base stations and at least one mobile station. The mobile station comprises a propagation loss measurement unit for measuring a propagation loss from the mobile station to each of the radio base stations and a moving speed detection unit for detecting a moving speed of the mobile station. Connected to the propagation loss measurement unit and the moving speed detection unit, a soft handoff radio base station selection unit determines the radio base stations to be connected or to be disconnected on the basis of the propagation loss with reference to a connection threshold level and a disconnection threshold level which is higher than the connection threshold level by a hysteresis margin. The soft handoff radio base station selection unit sets the hysteresis margin so as to become larger when the moving speed is fast. The soft handoff radio base station selection unit sets the hysteresis margin so as to become smaller when the moving speed is slow.

According to an aspect of this invention, a mobile station is for use in a code division multiple access (CDMA) cellular type mobile radio communication system comprising a plurality of radio base stations. The mobile station comprises a propagation loss measurement unit for measuring a propagation loss from said mobile station to each of the radio base stations. Connected to the propagation loss measurement unit, a soft handoff radio base station selection unit determines the radio base stations to be connected or to be disconnected on the basis of the propagation loss. The soft handoff radio base station selection unit selects the radio base stations to be connected so as to become more when a level of the propagation loss changes rapidly. The soft handoff radio base station selection unit selects the radio base stations to be connected so as to become less when the level of the propagation loss changes slowly.

According to another aspect of this invention, a mobile station is for use in a code division multiple access (CDMA) cellular type mobile radio communication system comprising a plurality of radio base stations. The mobile station comprises a propagation loss measurement unit for measuring a propagation loss from said mobile station to each of the radio base stations. Connected to the propagation loss measurement unit, a soft handoff radio base station selection unit determines the radio base stations to be connected or to be disconnected on the basis of the propagation loss with reference to a connection threshold level and a disconnection threshold level which is higher than the connection threshold level by a hysteresis margin. The soft handoff radio base station selection unit sets the hysteresis margin so as to become larger when a level of the propagation loss changes rapidly. The soft handoff radio base station selection unit sets the hysteresis margin so as to become smaller when the level of the propagation loss changes slowly.

According to still another aspect of this invention, a mobile station is for use in a code division multiple access (CDMA) cellular type mobile radio communication system comprising a plurality of radio base stations. The mobile station comprises a propagation loss measurement unit for measuring a propagation loss from the mobile station to each of the radio base stations and a moving speed detection unit for detecting a moving speed of the mobile station. Connected to the propagation loss measurement unit and the moving speed detection unit, a soft handoff radio base station selection unit determines the radio base stations to be connected or to be disconnected on the basis of the propagation loss. The soft handoff radio base station selection unit selects the radio base stations to be connected so as to become more when the moving speed is fast. The soft handoff radio base station selection unit selects the radio base stations to be connected so as to become less when the moving speed is slow.

According to yet another aspect of this invention, a mobile station is for use in a code division multiple access (CDMA) cellular type mobile radio communication system comprising a plurality of radio base stations. The mobile station comprises a propagation loss measurement unit for measuring a propagation loss from the mobile station to each of the radio base stations and a moving speed detection unit for detecting a moving speed of the mobile station. Connected to the propagation loss measurement unit and the moving speed detection unit, a soft handoff radio base station selection unit determines the radio base stations to be connected or to be disconnected on the basis of the propagation loss with reference to a connection threshold level and a disconnection threshold level which is higher than the connection threshold level by a hysteresis margin. The soft handoff radio base station selection unit sets the hysteresis margin so as to become larger when the moving speed is fast. The soft handoff radio base station selection unit sets the hysteresis margin so as to become smaller when the moving speed is slow.

DESCRIPTION OF THE PREFERRED EMBODIMENTS

Figure 1:
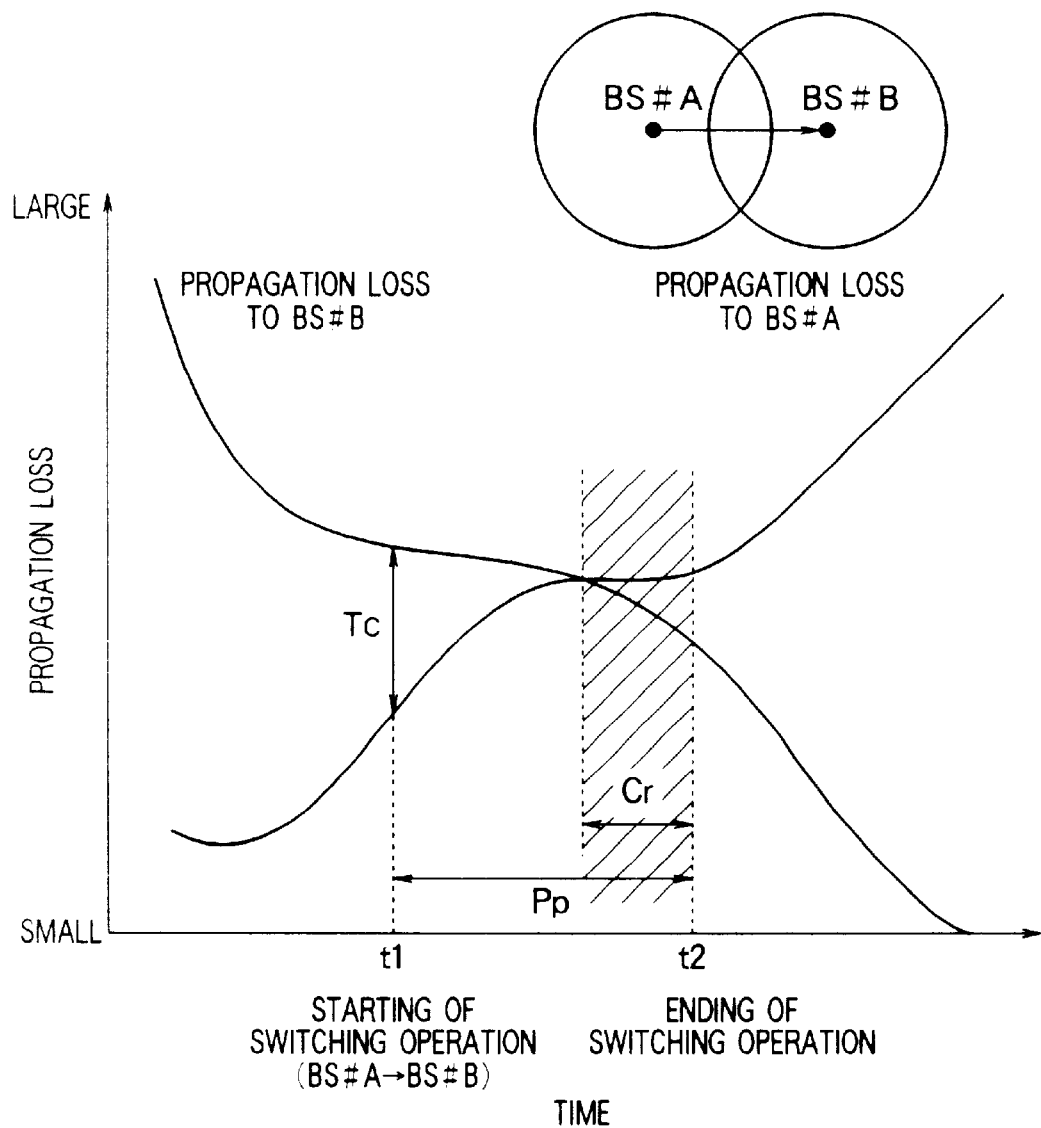
FIG. 1 is a view showing a conventional switching process for radio base stations with respect to variation of a propagation loss in a case where soft handoff is not carried out.
Figure 2:
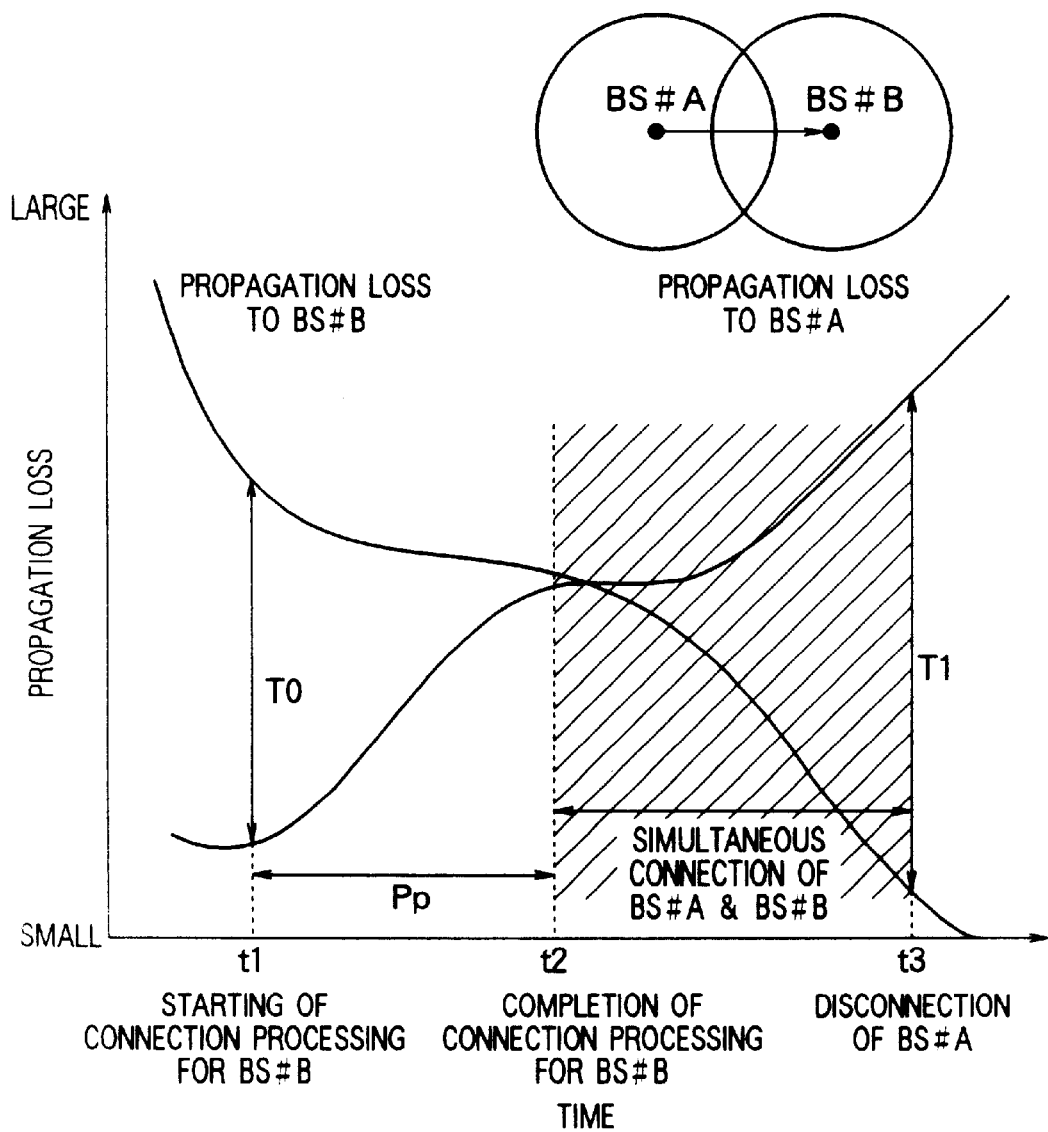
FIG. 2 is a view showing another conventional switching process for radio base stations with respect to variation of a propagation loss in a case where soft handoff is carried out.

Referring to FIGS. 1 and 2, conventional methods for selecting radio base stations in a mobile station of a code division multiple access (CDMA) cellular type mobile radio communication system will be described in order to facilitate an understanding of the present invention.

The CDMA cellular type mobile radio communication system comprises a plurality of radio base stations which are unevenly distributed and which simultaneously use a carrier having the same carrier frequency. In the CDMA cellular type mobile radio communication system, a mobile station must always connect the radio base station having the minimum propagation loss and must suppress interference in other radio channels so as to minimize by carrying out transmission power control. Inasmuch as connection processing to a new radio base station takes a certain time, the radio base station having the minimum propagation loss changes in dependency on variation of the propagation loss during this period and there is a case where a radio base station of a destination to be switched is affected by interference.

Referring to FIG. 1, description will proceed to interference to the radio base station to be changed that occurs on connect processing to the above-mentioned new radio base station. In FIG. 1, the abscissa and the ordinate represent time and propagation loss, respectively. In addition, Tc represents a connection threshold level, Pp represents a connection processing time interval required for switching operation of the radio base station, and Cr represents a time indicative of interval where interference is influenced.

It is assumed that a mobile station connected to a first radio base station BS#A moves to a zone or a cell which is covered by a second radio base station BS#B. Under the circumstances, the mobile station starts switching processing for the radio base stations at a time instant $t_1$ when a difference between the propagation losses of the first and the second radio base stations BS#A and BS#B is less than the connection threshold level Tc. In addition, the mobile station carries out transmission power control for the first radio base station BS#A for the connection processing time interval Pp.

As shown in FIG. 1, the propagation loss for the second radio base station BS#B is less than that for the first radio base station BS#A during the time interval Cr in the connection processing time interval Pp. In this event, inasmuch as the mobile station carries out the transmission power control for the first radio base station BS#A, the mobile station interferes in the second radio base station BS#B having a less propagation loss than that of the first base station BS#A. That is, the interference extends to the second base station BS#B during the time interval Cr. At a time instant, $t_2$, switching operation from the first radio base station BS#A to the second radio base station BS#B comes to an end.

In order to overcome the above-mentioned interference problem due to this connection processing, a method is disclosed an article which is contributed by Allen Salmasi et al. to Proceeding in IEEE Vehicular Technology Conference, pages 57–62, May 1991, under the title of "ON THE SYSTEM DESIGN ASPECTS OF CODE DIVISION MULTIPLE ACCESS (CDMA) APPLIED TO DIGITAL CELLULAR AND PERSONAL COMMUNICATIONS NETWORKS." The method described in the above-mentioned reference is called a soft handoff or a soft handover. The soft handoff uses a technique which has ready for variation of the propagation loss by simultaneously connecting a mobile station with a plurality of radio base stations which include not only the radio base station having the minimum propagation loss but also a radio base station candidate which may come to have minimum pass loss hereafter.

Referring to FIG. 2, description will proceed to the soft handoff in a conventional CDMA cellular type mobile radio communication system. In FIG. 2, the abscissa and the ordinate represent time and propagation loss, respectively. In addition, T0 represents a connection threshold level for the radio base stations in a conventional method on carrying out the soft handoff, T1 represents a disconnection threshold level for the radio base stations in the conventional method on carrying out the soft handoff, and Pp represents the connection processing time interval required for switching operation of the radio base stations.

It is assumed that a mobile station connected to a first radio base station BS#A roves to a zone or a cell covered by a second radio base station BS#B. Under the circumstances, the mobile station starts connection processing for the second radio base station BS#B with connection of the first radio base station BS#A held at a time instant $t_1$ when a difference between the propagation losses of the first and the second radio base stations BS#A and BS#B is less than the connection threshold level T0. When connection processing for the second radio base station BS#B completes at a time instant $t_2$ after the lapse of the connection processing time interval Pp, simultaneous connection of the first and the second radio base stations BS#A and BS#B start. Inasmuch as the transmission power control for the radio base station having the minimum propagation loss is always carried out during simultaneous connection, the issue related to the interference for the second radio base station BS#B dies although that issue does not die in a hard handoff method illustrated in FIG. 1. Thereafter, connection of the fist radio base station BS#A is released at a time instant $t_3$ when the difference between the propagation losses of the first and the second radio base stations BS#A and BS#B is more than the disconnection threshold level T1. In the manner which is described above, by carrying out the simultaneous connection of the radio base stations whose propagation loss levels are immediate, it is possible to cope with alternation of the radio base stations having the minimum propagation loss and to suppress the interference.

The connection threshold level T0 and the disconnection threshold level T1 are set so that the latter is higher than the former. A difference between the connection threshold level T0 and the disconnection threshold level T1 is referred to as a hysteresis margin in the art. That is, the hysteresis margin defines release from connection of the radio base stations. The hysteresis margin is prepared in order to prevent switching of connection and disconnection of the radio base stations from occurring frequently in a case where the difference between the propagation losses of the radio base stations varies heavily in the vicinity of the threshold level. The higher the connection threshold level T0 and the disconnection threshold level T1 become, the larger the number of the radio base stations simultaneously connected is.

However, a rate and a magnitude of variation in the propagation loss from the mobile station to each radio base station varies in accordance with a moving speed of the mobile station and circumferential propagation environment. For instance, the propagation loss extremely varies in cities where buildings are in close order so far as the mobile station moves slightly. This is because there are many objects which cut off paths for propagation of radio waves in the cities. In other words, in the cities, the variation of the propagation loss is fast and the magnitude thereof is large On the other hand, in the suburbs of the cities, the variation of the propagation loss is slow and the magnitude thereof is small. This is because there are a few objects which cut off paths for propagation of radio waves in the suburbs.

In the above-mentioned conventional methods for selecting radio base stations, the threshold level for the propagation loss always has a constant level disregarding the circumferential propagation environment. However, it is necessary in an area where the variation of the propagation loss is fast such as the cities to set the threshold level for the propagation loss to be high in order to cope with rapid variation of the propagation loss. Otherwise, connection of the radio base station having the minimum propagation loss is late and it results in inflicting the interference upon the radio base station in question. On the other hand, in the suburbs where the variation of the propagation loss is slow, it is possible to set the threshold level for the propagation loss to be low. In other words, it is difficult to realize effective system operation in a case of using a fixed threshold level for the propagation loss. This is because excess and deficiency of the radio base stations simultaneously connected occur.

In addition, the hysteresis margin may be set to be small in a case where the variation of the propagation loss is slow. This is because the switching of the connection and the disconnection does not occur frequently. Conversely, if unnecessary large hysteresis margin is set, connection of useless radio base stations is maintained and it results in obstructing the effective system operation.

Figure 3:
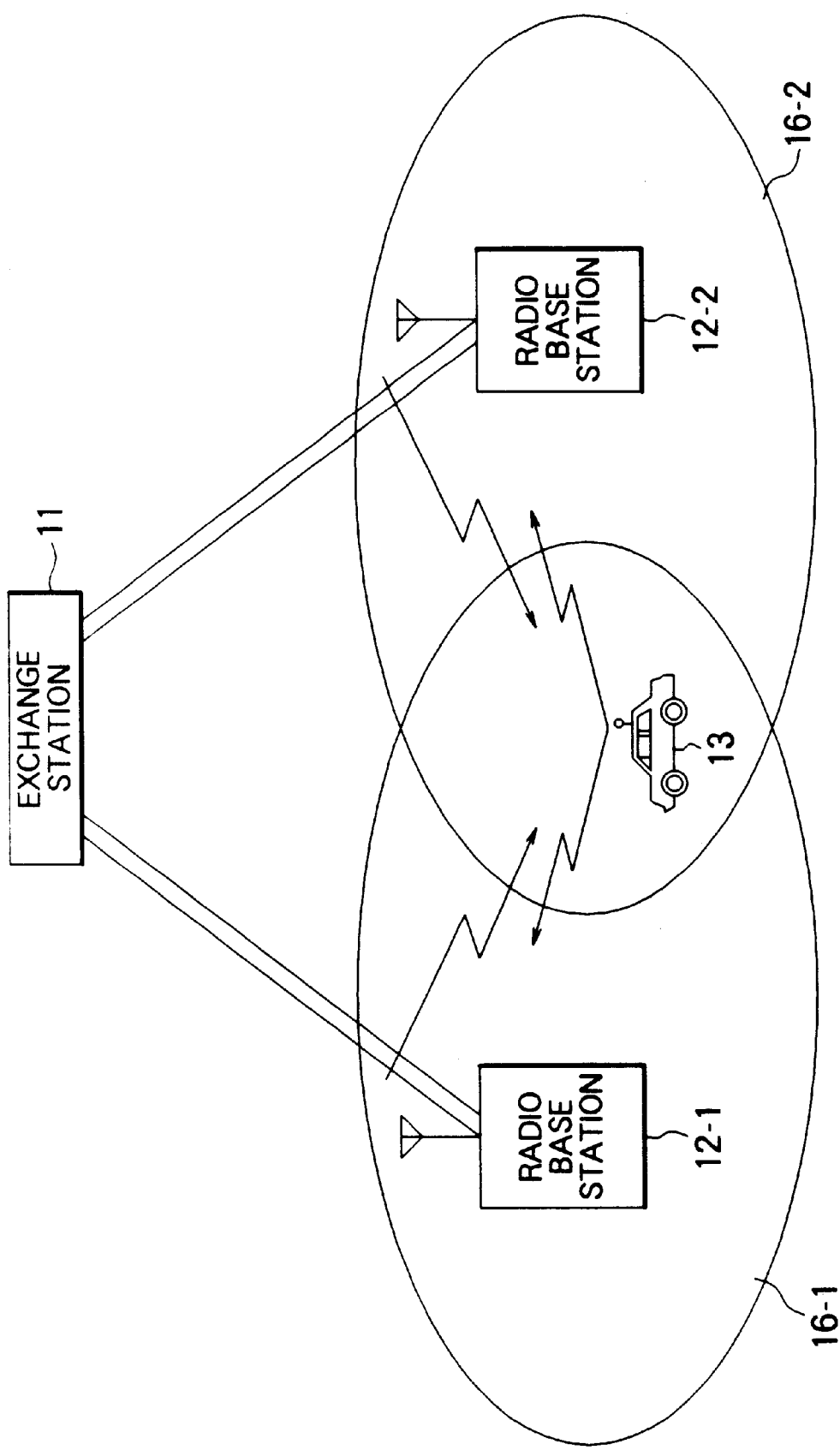
FIG. 3 shows a connection state in a code division multiple access (CDMA) cellular type mobile radio communication system.

FIG. 3 is a view showing a connection state in a code division multiple access (CDMA) cellular type mobile radio communication system on a sort handoff, The illustrated CDMA cellular type mobile radio communication system comprise an exchange station 11, first and second radio base stations 12-1 and 12-2, and a plurality of mobile stations (only one mobile station 13 is illustrated in the drawing). In the example being illustrated, although the CDMA cellular type mobile radio communication system comprises two radio base stations 12-1 and 12-3, the CDMA cellular type mobile radio communication system may comprise three or more radio base stations.

As is well known in the art, the CDMA cellular type mobile radio communication system can carry out the soft handoff where the mobile station 13 simultaneously communicates two or more different radio base stations although the mobile station 13 simultaneously communicates the first and the second radio base stations 12-1 and 12-2 in the example being illustrated in FIG. 3. This is because all radio base stations communicate using a carrier having the same carrier frequency.

In FIG. 3, the first radio base station 12-1 covers a first service area or cell 16-1 while the second radio base 12-2 covers a second service area or cell 16-2. In addition, the mobile station 13 lies in an area which is overlapped in the first and the second service areas 16-1 and 16-2. Under the circumstances, the mobile station 13 can simultaneously communicate with the first and the second radio base stations 12-1 and 12-2. This is the soft handoff or the soft handover. Herein, the service area is a receivable area where the mobile station can receive a downward communication channel signal from the radio base station disposed therein.

Figure 4:
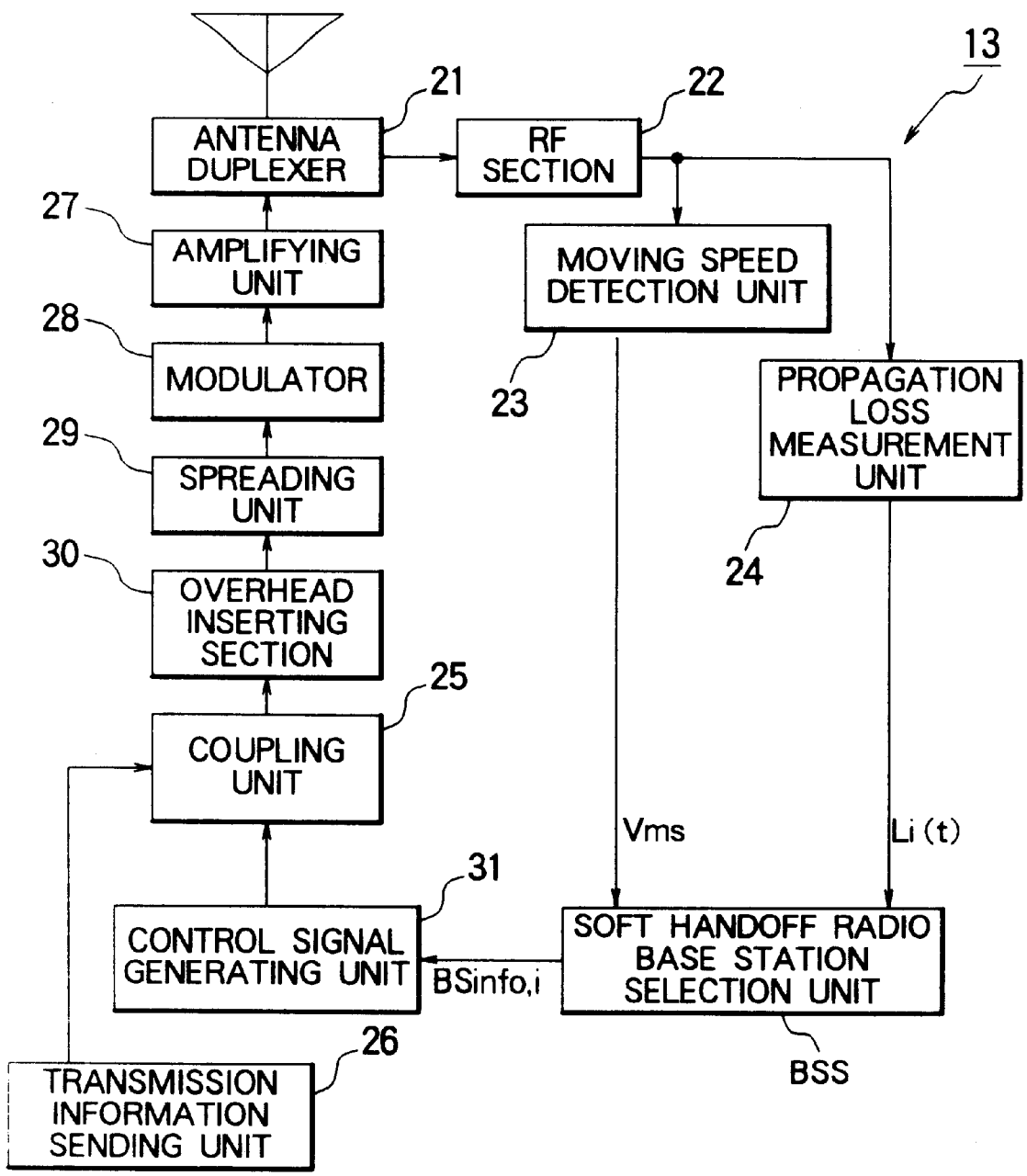
FIG. 4 is a block diagram of a mobile station for use in the CDMA cellular type mobile radio communication system illustrated in FIG. 3.

Turning to FIG. 4, the mobile station 13 comprises an antenna duplexer 21, a radio frequency (RF) section 22, a moving speed detection unit 23, a propagation loss measurement unit 24, a coupling unit 25, a transmission information sending unit 26, an amplifying unit 27, a modulator 28, a spreading unit 29, an overhead inserting section 30, a control signal generating unit 31, and a soft handoff radio base station selection unit BSS.

Description will be made as regards operation of the mobile station 13 illustrated in FIG. 4. Transmitted from the radio base stations, like as 12-1 and 12-2 (FIG. 3), transmission signals are received in the antenna duplexer 21 as received signals. The received signals are supplied to the radio frequency section 22. The radio frequency section 22 demodulates the received signals into demodulated signals. The demodulated signals are supplied to the moving speed detection unit 23 and the propagation loss measurement unit 24. The moving speed detection unit 23 detects, in response to the demodulated signals, a moving speed Vms of the mobile station 13 to produce a moving speed detection signal indicative of the moving speed Vms. On the other hand, the propagation loss measurement unit 24 estimates, on the basis of the demodulated signals, a propagation loss $Li(t)[dB]$ of each of the radio base stations which are positioned in the vicinity of the mobile station 13, where a suffix i represents an index of each radio base station that is given by an integer between 0 and N, both inclusive, and a variable t represents a measurement time instant. The propagation loss measurement unit 24 produces a propagation loss measured signal indicative of the propagation loss $Li(t)$.

In addition, the propagation losses of the radio base stations are roughly estimated, for example, on the basis of reception strengths of pilot signals sent from the respective radio base stations and transmission outputs of the pilot signals.

The moving speed detection signal and the propagation loss measured signal are supplied to the soft handoff radio base station selection unit BSS. The soft handoff radio base station selection unit BSS determines radio base stations to be newly soft handed off and radio base stations to be released from connection thereof. A determined result indicative of the radio base stations to be newly soft handed off and of the radio base stations to be released from the connection thereof is given as a connection/release variable BSinfo,i. The connection/release variable BSinfo,i has a value which is selected from 1, −1, and 0. (BSinfo,i=1) means a connection request for requesting to connect the mobile station 13 with an i-th radio base station in question. That is, (BSinfo,i=1) is called a connection command. (BSinfo,i=−1) means a release request for requesting to release connection from the i-th radio base station in question. That is, (BSinfo,i=−1) is referred to as a disconnection command. In addition, (BSinfo,i=0) means holding or maintaining a current state or condition of connection or disconnection for the i-th radio base station in question. That is, (ESinfo,i=0) is called a present condition maintenance command or a non-operation command.

The soft handoff radio vase station selection unit BSS supplies the connection/release variable BSinfo,i to the control signal generating unit 31. Responsive to the connection/release variable BSinfo,i, the control signal generating unit 31 generates a control signal indicative of the effect thereof to send it to a group of the radio base stations where connection or release is requested.

The control signal generating unit 31 delivers the control signal to the coupling unit 25. In addition, the transmission information sending unit 26 sends transmission information to the coupling unit 25. The coupling unit 25 couples the transmission information with the control signal to produce a coupled signal.

The coupled signal is supplied to the overhead inserting section 30. The overhead inserting section 30 inserts overhead information into the coupled signal. The overhead information includes various additional information. The overhead inserting section 30 produces an overhead inserted signal which is supplied to the spreading unit 29. The spreading unit 29 spreads the overhead inserted signal by a spreading code intrinsic to the mobile station 13. The spreading unit 29 produces a spread signal.

The spread signal is supplied to the modulator 28. The modulator 28 modulates a carrier with the spread signal to produce a modulated signal. The modulated signal is supplied to the amplifying unit 27. The amplifying unit 27 amplifies the modulated signal to produce an amplified signal. The amplified signal is supplied to the antenna duplexer 21. The antenna duplexer 21 transmits the amplified signal to the radio base station.

Figure 5:
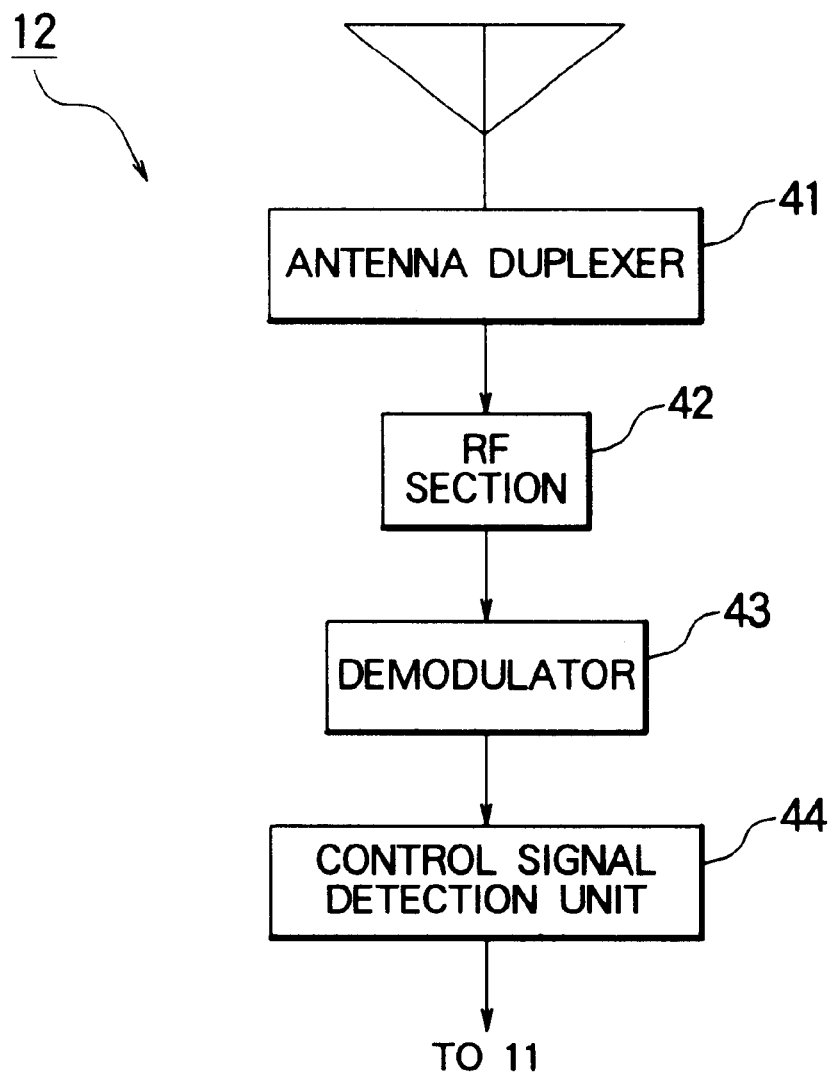
FIG. 5 is a block diagram of a radio base station for use in the CDMA cellular type mobile radio communication system illustrated in FIG. 3.

Referring to FIG. 5, the radio base station 12 (suffix omitted) comprises an antenna duplexer 41, a radio frequency (RF) section 42, a demodulator 43, and a control signal detection unit 44.

Description will be made as regards operation of the radio base station 12 illustrated in FIG. 5. Transmitted from the mobile station 13 (FIG. 4), a transmission signal is received in the antenna duplexer 41 as a received signal. The received signal is supplied to the radio frequency section 42. The radio frequency section 42 converts the received signal into an intermediate frequency signal. The intermediate frequency signal is supplied to the demodulator 43. The demodulator 43 demodulates the intermediate frequency signal into a demodulated signal which includes the above-mentioned control signal. The demodulated signal is supplied to the control signal detection unit 44. The control signal detection unit 44 detects the control signal in the demodulated signal. The control signal detection unit 44 produces a detected control signal. The detected control signal is supplied to the exchange unit 11 (FIG. 3).

As described above, the detected control signal or the control signal includes either the connection command for the radio base station or the disconnection command for the radio base station. When the detected control signal includes the connection command, the exchange station 11 carries out connection processing for the radio base station in question. When the detected control signal includes the disconnection command, the exchange station 11 carries out disconnection processing for the radio base station in question.

Figure 6:
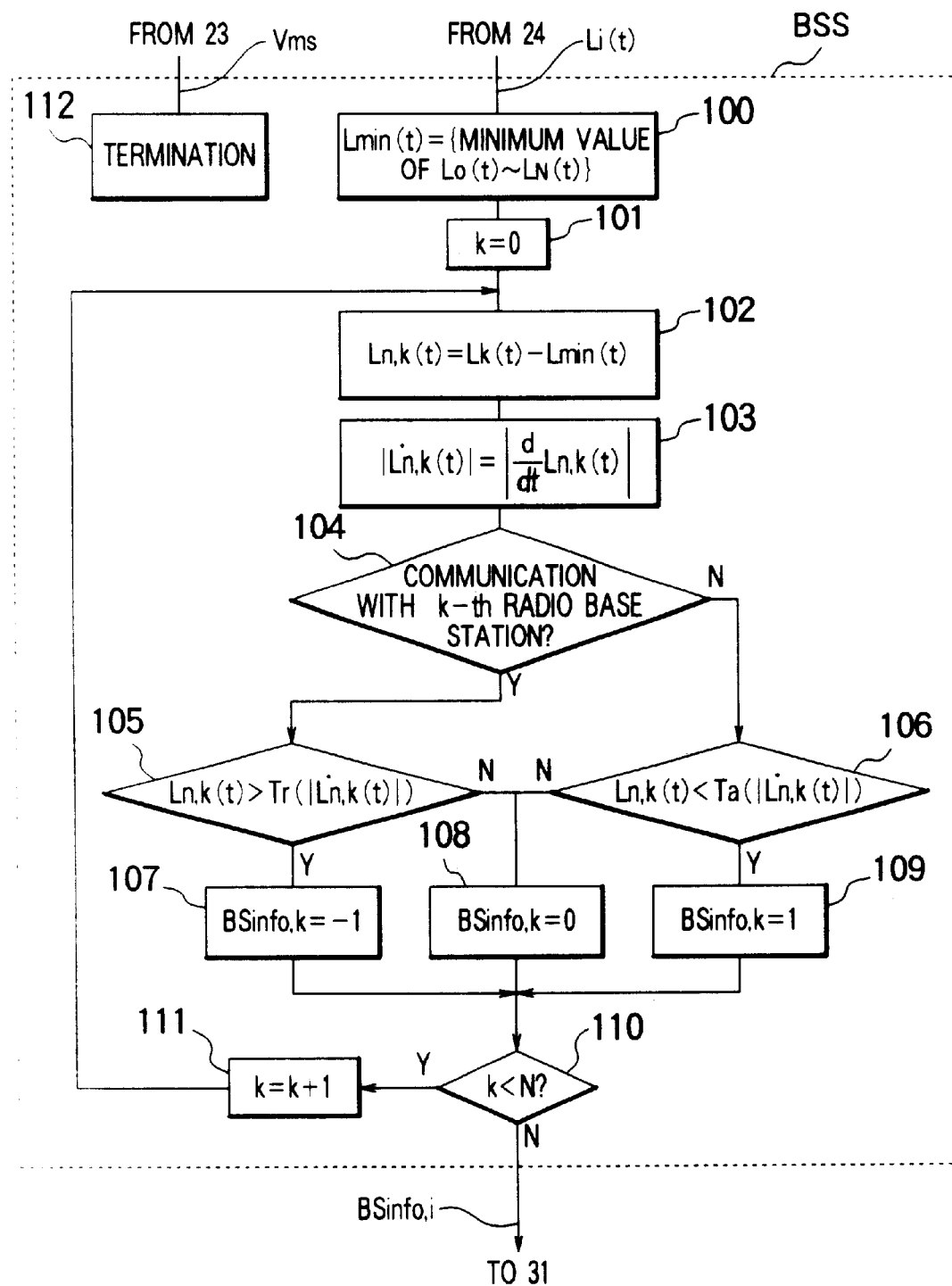
FIG. 6 shows a flow chart for use in describing a first radio base station selection method performed by a soft handoff radio base station selection unit for use in the mobile station illustrate in FIG. 4.

Referring to FIG. 6, description will proceed to a radio base station selection operation in the soft handoff radio base station selection unit BBS. In the example being illustrated, the soft handoff radio base station selection unit BBS calculates, on the basis of the propagation losses Li(t) between the mobile station 13 and the radio base stations, variation rates for the propagation losses Li(t) to determine connection and disconnection threshold levels Ta and Tr for the radio base stations on the basis of the variation rates for the propagation losses Li(t) in the manner which will later become clear.

The soft handoff radio base station selection unit BSS defines a minimum value of the propagation losses Li(t)[dB] as a minimum propagation loss Lmin(t)[dB] at a step 100. The step 100 is succeeded by a step 101 at which the soft handoff radio base station selection unit BSS initializes a loop variable k indicative of the number of the radio base station to zero. The step 101 is followed by a step 102 at which the soft handoff radio base station selection unit BSS subtracts the minimum propagation loss Lmin(t) from a k-th propagation loss Lk(t) for a k-th radio base station to obtain a k-th relative propagation loss Ln,k(t)[dB]. That is:

$$Ln,k(t)=Lk(t)-L\min(t).$$

The step 102 proceeds to a step 103 at which the soft handoff radio base station selection unit BSS calculates a k-th absolute value $|\dot{L}n,k(t)|$ of a differential value in the k-th relative propagation loss Ln,k(t). That is:

$$|\dot{L}n, k(t)| = \left|\frac{d}{dt}Ln, k(t)\right|$$

The k-th absolute value $|\dot{L}n,k(t)|$ is called a k-th variation rate. The step 103 is succeeded by a step 104 at which the soft handoff radio base station selection unit BSS determines whether or not the mobile station 13 communicates with the k-th radio base station. When the mobile station 13 communicates with the k-th radio base station, the step 104 is followed by a step 105. On the other hand, the step 104 proceeds to a step 106 when the mobile station 13 does not communicate with the k-th radio base station.

At the step 105, the soft handoff radio base station selection unit BSS calculates a value of the disconnection threshold level Tr defined as a function of the k-th variation rate $|\dot{L}n,k(t)|$ and determines whether or not the disconnection threshold level Tr($|\dot{L}n,k(t)|$) is less than the k-th relative propagation loss Ln,k(t), that is:

$$Ln,k(t)>Tr(|\dot{L}n,k(t)|).$$

When the disconnection threshold level Tr($|\dot{L}n,k(t)|$) is less than the k-th relative propagation loss Ln,k(t), the step 105 is succeeded by a step 107. Otherwise, the step 105 is followed by a step 108.

On the other hand, at the step 106, the soft handoff radio base station selection unit BSS calculates a value of the connection threshold level Ta defined as a function of the k-th variation rate $|\dot{L}n,k(t)|$ and determines whether or not the connection threshold level Ta($|\dot{L}n,k(t)|$) is more than the k-th relative propagation loss Ln,k(t), that is:

$$Ln,k(t)<Ta(|\dot{L}n,k(t)|).$$

When the connection threshold level Ta($|\dot{L}n,k(t)|$) is more than the k-th relative propagation loss Ln,k(t), the step 106 proceeds to a step 109. Otherwise, the step 106 is succeeded by the step 108.

At the step 107, the soft handoff radio base station selection unit BSS sets the value of −1 in an k-th connection/release variable BSinfo,k that means the release request for requesting to release connection from the k-th radio base station. In other words, the soft handoff radio base station selection unit BSS produces the disconnection command (BSinfo,k=−1). At the step 109, the soft handoff radio base station selection unit BSS sets the value of 1 in the k-th connection/release variable BSinfo,k that means the connection request for requesting to connect the mobile station 13 with the k-th radio base station. In other words, the soft handoff radio base station selection unit BSS produces the connection command (BSinfo,k=1). At the step 108, the soft handoff radio base station selection unit BSS sets the value of 0 in the k-th connection/release variable BSinfo,k that means holding the current state of connection or disconnection for the k-th radio base station. In other words, the soft handoff radio base station selection unit BSS produces the non-operation command (BSinfo,k=0).

Each of the steps 107 to 109 is followed by a step 110 at which the soft handoff radio base station selection unit BSS determines whether or not the loop variable k is not less than the total number N of the radio base stations. When the loop variable k is less than the total number N, the step 110 proceeds to a step 111 at which the soft handoff radio base station selection unit BSS increments the loop variable k by one. The soft handoff radio base station selection unit BSS turns back from the step 111 to the step 102. When the loop variable k is not less than the total number N, the soft handoff radio base station selection unit BSS supplies the connection/release variables BSinfo,i (i=0, . . . , N) to the control signal generating unit 31 illustrated in FIG. 4.

In addition, the moving speed Vms of the mobile station 13 that is detected by the moving speed detection unit 23 is not used in this embodiment to terminate at a step 112.

Figure 7:
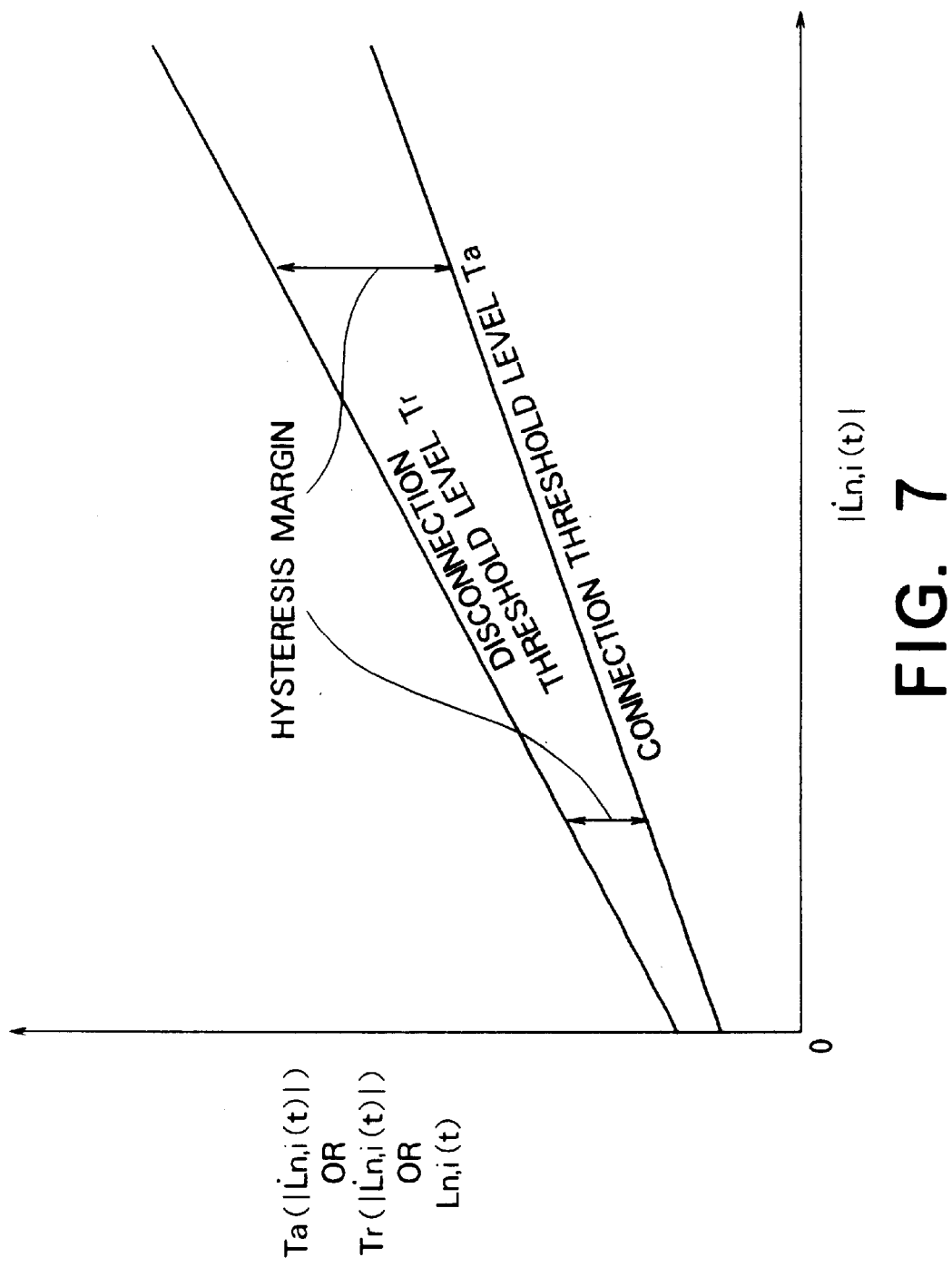
FIG. 7 is a graph exemplifying connection and disconnection threshold levels for the radio base stations with respect to a variation rate of a propagation loss.

FIG. 7 exemplifies the connection and the disconnection threshold levels Ta and Tr for the radio base stations. In FIG. 7, the abscissa represents the variation rate $|\dot{L}n,i(t)|$ of the relative propagation loss Ln,i(t) while the ordinate represents the connection threshold level Ta$|\dot{L}n,i(t)|$), the disconnection threshold level Tr($|\dot{L}n,i(t)|$), or the relative propagation loss Ln,i(t). Each of the connection threshold level Ta($|\dot{L}n,i(t)|$) and the disconnection threshold level Tr($|\dot{L}n,i(t)|$) is geven by the function of the variation rate Tr$|\dot{L}n,i(t)|$) as an argument As apparent from FIG. 7, the faster the variation rate $|\dot{L}n,i(t)|$ of the relative propagation loss Ln,i(t) is, the higher each of the connection and the disconnection threshold levels Ta and Tr is. In addition, the disconnection threshold level Tr is higher than the connection threshold level Ta by a hysteresis margin as shown in FIG. 7. Furthermore, the faster the variation rate $|\dot{L}n,i(t)|$ of the relative propagation loss Ln,i(t) is, the larger the hysteresis margin is. In other words, the hysteresis margin is also given by the function of the the variation rate $|\dot{L}n,i(t)|$ as an argument.

Referring to FIG. 7 in addition to FIG. 6, the description will proceed to the connection processing and the disconnection processing for the i-th radio base station in accordance with the flow chart illustrated in FIG. 6.

It will be assumed that the i-th radio base station is not connected to the mobile station 13. In this event, a point ($|\dot{L}n,i(t)|$, Ln,i(t)) for the i-tnh radio base station is sketched on FIG. 7. When the point ($|\dot{L}n,i(t)|$, Ln,i(t)) is positioned within an area which is lower than the connection threshold level Ta, the i-th radio base station is selected to connect the i-th radio base station with the mobile station 13.

On the other hand, it will be presumed that the i-th radio base station is connected to the mobile station 13. Under the circumstances, the point ($|\dot{L}n,i(t)|$, Ln,i(t)) for the i-th radio base station is sketched on FIG. 7. When the point ($|\dot{L}n,i(t)|$, Ln,i(t)) is positioned within another area which is higher than the disconnection threshold level Tr, connection of the i-th radio base station is released.

In a case other than the above-mentioned cases, a current condition of connection or disconnection is maintained.

Figure 8:
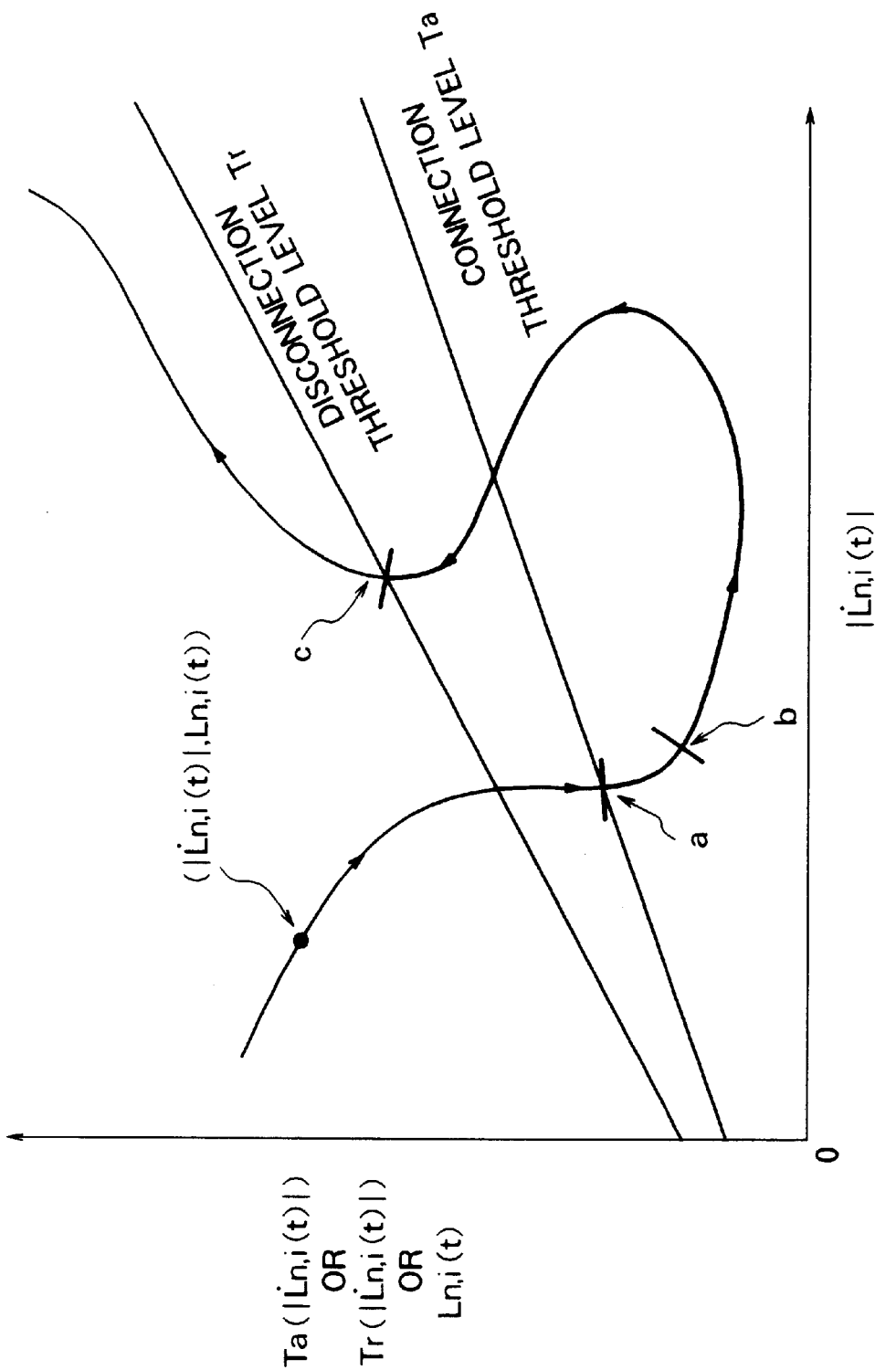
FIG. 8 is a view for use in describing operation for a period of time from selection of an i-th radio base station to disconnection of the i-th radio base station in a case where the connection and the disconnection threshold levels illustrated in FIG. 7 are applied.

Turning to FIG. 8, description will proceed to operation for a period of time from selection of the i-th radio base station to connection release of the i-th radio base station in a case where the connection and the disconnection threshold levels Ta and Tr illustrated in FIG. 7 are applied. In FIG. 8, the abscissa represents the variation rate L$|\dot{L}n,i(t)|$ of the relative propagation loss Ln,i(t) while the ordinate represents the connection threshold level Ta($|\dot{L}n,i(t)|$), the disconnection threshold level Tr($|\dot{L}n,i(t)|$), or the relative propagation loss Ln,i(t). Sketched on a graph illustrated in FIG. 8, a locus or a trajectory of a set of points ($|\dot{L}n,i(t)|$, Ln,i(t)) for the i-th radio base station is described by a curved line. The point ($|\dot{L}n,i(t)|$, Ln i(t)) translates along the locus with the passage of the time in the direction as indicated by the arrow illustrated in FIG. 8.

It is assumed that the point ($|\dot{L}n,i(t)|$, Ln,i(t)) reaches a time instant a on the locus where the locus crosses or intersects the connection threshold level Ta. In this event, the mobile station 13 starts connection processing for the i-th radio base station. After the connection processing, the mobile station 13 starts connection for the i-th radio base station at a time instant b. Thereafter, it is presumed that the point ($|\dot{L}n,i(t)|$, Ln,i(t)) arrives at a time instant c on the locus where the locus crosses or intersects the disconnection threshold level Tr. Under the circumstances, the mobile station 13 immediately releases the connection of the i-th radio base station. Ultimately, the mobile station 13 is in communication with the i-th radio base station during a period of time from the time instant b to the time instant c.

Figure 9:
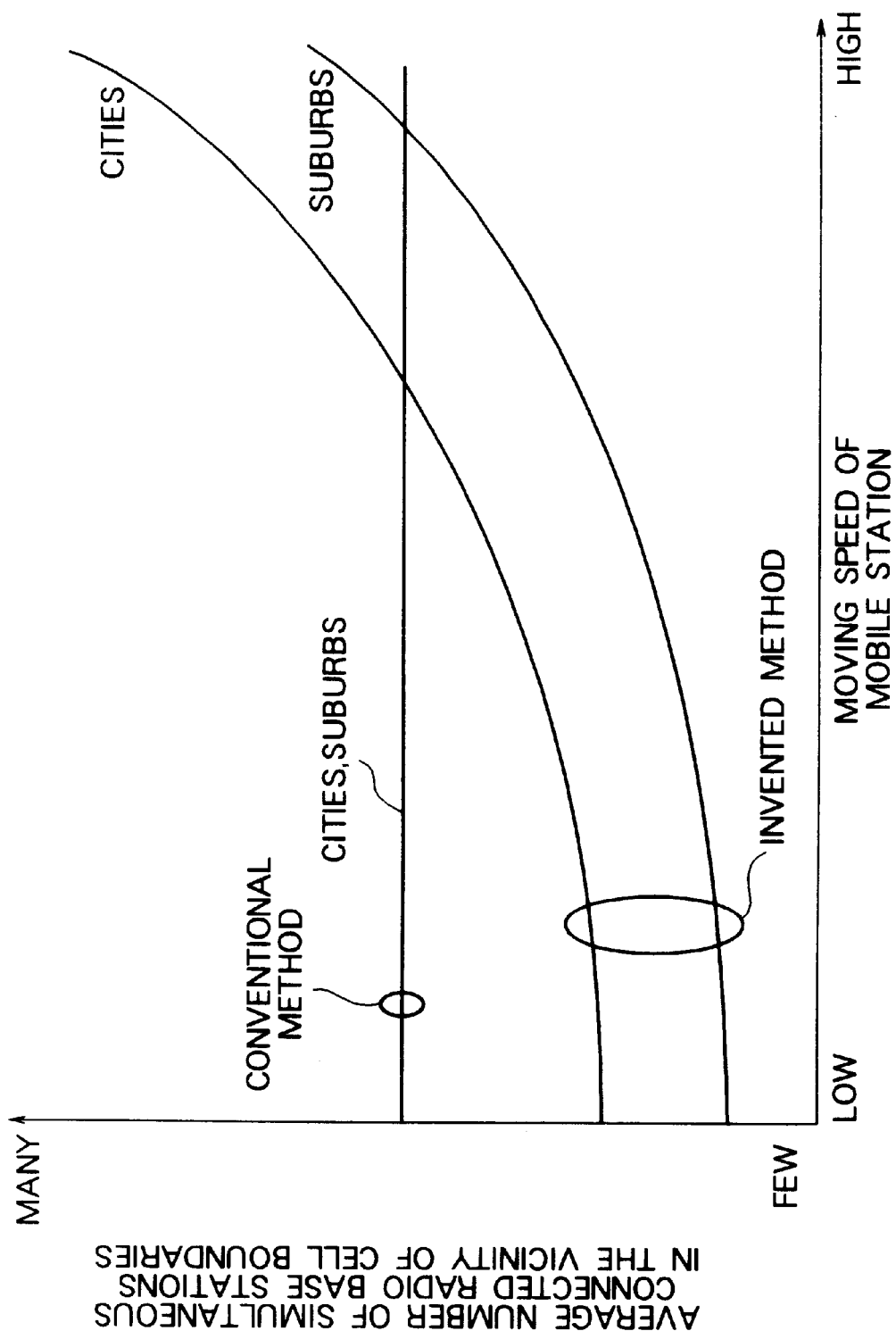
FIG. 9 is a graph showing the average number of radio base stations simultaneously connected to a mobile station in the vicinity of cell boundaries relative to a moving speed of the mobile station in both of a case where a radio base station selection method of the present invention is carried out and of a case where a conventional radio base station selection method is carried out.

FIG. 9 exemplifies the average number of radio base stations which are simultaneously connected with the mobile station in the vicinity of cell boundaries relative to the moving speed of the mobile station in both of a case where the radio base station selection method of the present invention is carried out and of a case where a conventional radio base station selection method is carried out. In FIG. 9, the abscissa and the ordinate represent the moving speed of the mobile station and the nether of radio base stations which are simultaneously connected with the mobile station in the vicinity of the cell boundaries, respectively.

As apparent from FIG. 9, the conventional radio base station selection method always has a constant number of the simultaneously connected radio base stations independent of the moving speed of the mobile station. On the contrary, the radio base station selection method according to the present invention realizes effective system operation by decreasing the number of the simultaneously connected radio base stations in a case where the moving speed of the mobile station is low. In addition, although propagation environment such as cities and the suburbs varies, the conventional radio base station selection method always has the constant number of the simultaneously connected radio base stations independent of the propagation environment. On the contrary, the radio base station selection method according to the present invention has a larger number of the simultaneously connected radio base stations in the cities than that in the suburbs. As a result, it is possible for the present invention to carry out communication having high reliability that copes with a rapid variation in the propagation loss encountering the cities.

Figure 10:
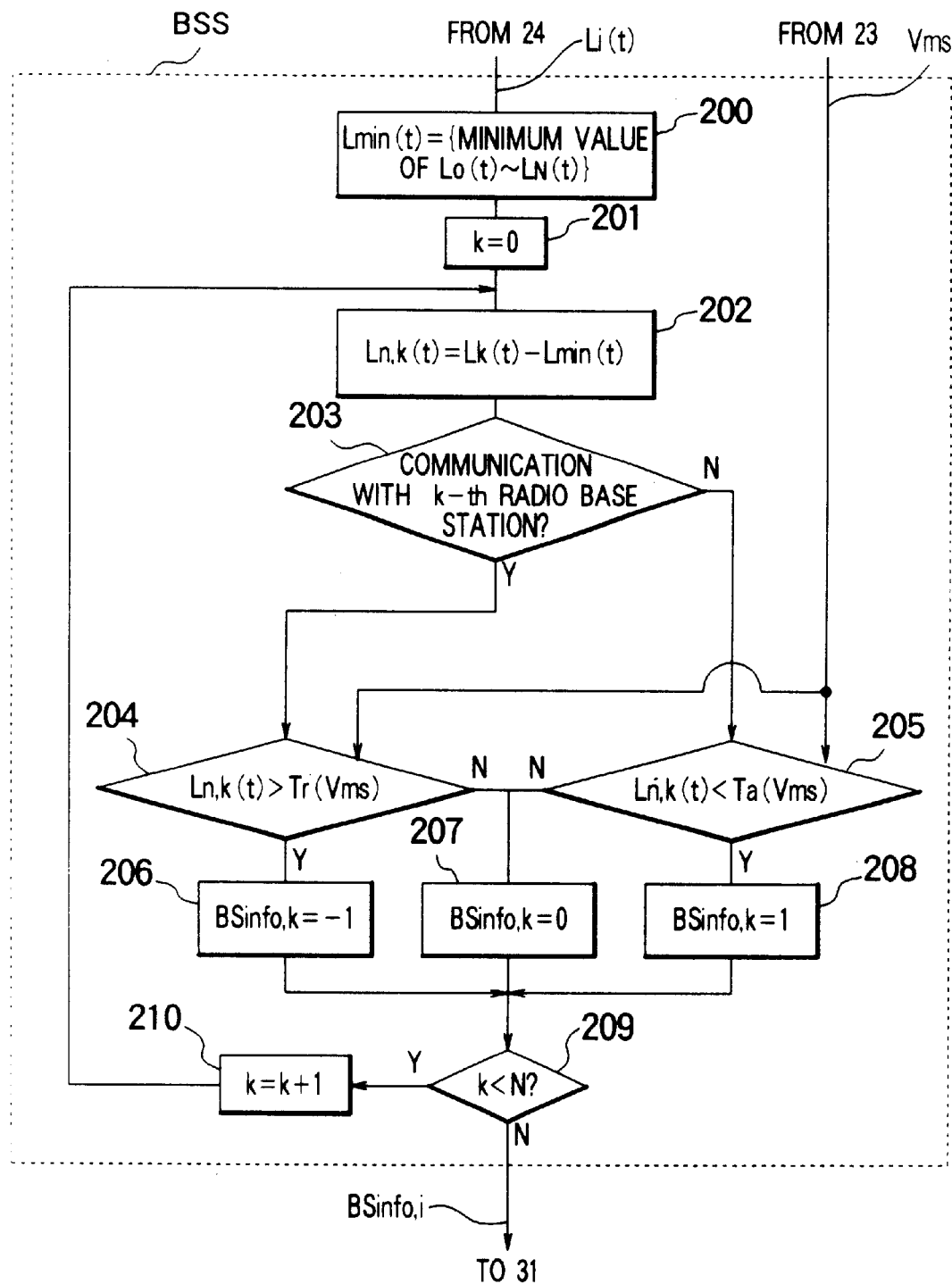
FIG. 10 shows a flow chart for use in describing a second radio base station selection method performed by a soft handoff radio base station selection unit for use in the mobile station illustrate in FIG. 4.

Referring to FIG. 10, description will proceed to another radio base station selection operation in the soft handoff radio base station selection unit BBS. As is well known in the art, the variation rate for the propagation loss for each radio base station is generally in proportion to the moving speed of the mobile station. Thought from this fact, in the example being illustrated, the soft handoff radio base station selection unit BBS determines connection and disconnection threshold levels Ta and Tr for the radio base stations on the basis of the moving speed of the mobile station 13 that is detected by the moving speed Vms detection unit 23 in the manner which will later become clear. That is, each of the connection and the disconnection threshold levels Ta and Tr is given by a function of the moving speed Vms as an argument. In addition, the hysteresis margin is also given by a function of the moving speed Vms as an argument.

The soft handoff radio base station selection unit BSS defines a minimum value of the propagation losses Li(t)[dB] between the mobile station 13 and the radio base stations as a minimum propagation loss Lmin(t)[dB] at a step 200. The step 200 is succeeded by a step 201 at which the soft handoff radio base station selection unit BSS initializes a loop variable k indicative of a number of the radio base station to zero. The step 201 is followed by a step 202 at which the soft handoff radio base station selection unit BSS subtracts the minimum propagation loss Lmin(t) from a k-th propagation loss Lk(t) for a k-th radio base station to obtain a k-th relative propagation loss Ln,k(t)[db]. That is:

$$Ln,k(t)=Lk(t)-Lmin(t).$$

The step 102 proceeds to a step 203 at which the soft handoff radio base station selection unit BSS determines whether or not the mobile station 13 communicates with the k-th radio base station. When the mobile station 13 communicates with the k-th radio base station, the step 203 is followed by a step 204. On the other hand, the step 203 proceeds to a step 205 when the mobile station 13 does not communicate with the k-th radio base station.

At the step 204, the soft handoff radio base station selection unit BSS receives the moving speed Vms of the mobile station 13 from the moving speed detection unit 23, calculates a value of the disconnection threshold level Tr defined as a function of the moving speed Vms of the mobile station 13, and determines whether or not the disconnection threshold level Tr(Vms) is less than the k-th relative propagation loss Ln,k(t), that is:

$$Ln,k(t)>Tr(Vms).$$

When the disconnection threshold level Tr(Vms) is less than the k-th relative propagation loss Ln,k(t), the step 204 is succeeded by a step 206. Otherwise, the step 204 is followed by a step 207.

On the other hand, at the step 205, the soft handoff radio base station selection unit BSS receives the moving speed Vms of the mobile station 13 from the moving speed detection unit 23, calculates a value of the connection threshold level Ta defined as a function of the moving speed Vms of the mobile station 13, and determines whether or not the connection threshold level Ta(Vms) is more than the k-th relative propagation loss Ln,k(t), that is:

$$Ln,k(t)<Ta(Vms).$$

When the connection threshold level Ta(Vms) is more than the k-th relative propagation loss Ln,k(t), the step 205 proceeds to a step 209. Otherwise, the step 205 is succeeded by the step 207.

At the step 206, the soft handoff radio base station selection unit BSS sets the value of −1 in an k-th connection/release variable BSinfo,k that means the connection release request for requesting to release connection from the k-th radio base station. In other words, the soft handoff radio base station selection unit BSS produces the disconnection command (BSinfo,k=−1). At the step 208, the soft handoff radio base station selection unit BSS sets the value of 1 in the k-th connection/release variable BSinfo,k that means the connection request for requesting to connect the mobile station 13 with the k-th radio base station. In other words, the soft handoff radio base station selection unit BSS produces the connection command (BSinfo,k=1). At the step 207, the soft handoff radio base station selection unit BSS sets the value of 0 in the k-th connection/release variable BSinfo,k that means holding a current condition of connection or disconnection for the k-th radio base station of connection or disconnection. In other words, the soft handoff radio base station selection unit BSS produces the non-operation command (BSinfo,k=0).

Each of the steps 206 to 208 is followed by a step 209 at which the soft handoff radio base station selection unit BSS determines whether or not the loop variable k is not less than the total number N of the radio base stations. When the loop variable k is less than the total number N, the step 209 proceeds to a step 210 at which the soft handoff radio base station selection unit BSS increments the loop variable k by one. The soft handoff radio base station selection unit BSS turns back from the step 210 to the step 202. When the loop variable k is not less than the total number N, the soft handoff radio base station selection unit BSS supplies the connection/release variables ESinfo,i (i=0, . . . , N) to the control signal generating unit 31 illustrated in FIG. 4.

As described above, the variation rate for the propagation loss for each radio base station is in proportion to the moving speed of the mobile station. The soft handoff radio base station selection unit BSS illustrated in FIG. 10 is a technique so as to indirectly estimate the variable rate for the propagation loss for each radio base station on the basis of the moving speed Vms of the mobile station 13.

In contrast to this, the soft handoff radio base station selection unit BSS illustrated in FIG. 6 is a technique so at to directly calculate the variable rate for the propagation loss for each radio base station by differentiating the estimated propagation loss with respect to time. It is assumed that the estimated propagation loss includes an error component in the soft handoff radio base station selection unit BSS. In this event, inasmuch as the error component in the estimated propagation loss propagates in an estimated value of the variation rate, there is a problem so that an error occurs in an estimated value of the variation rate.

In comparison with this, it is possible for the soft handoff radio base station selection unit BSS illustrated in FIG. 10 to avoid propagation of an error. This is because the error component in the estimated propagation loss is separated from an error in the variation rate of the propagation loss.

While this invention has thus far been described in conjunction with preferred embodiments thereof, it will now be readily possible for those skilled in the art to put this invention into various other manners.

What is claimed is:

1. A method of selecting radio base stations in a single mobile station of a code division multiple access (CDMA) mobile radio communication system in which several radio base stations are simultaneously connected to said single mobile station, said method comprising the steps of:

selecting the radio base stations to be connected so as to become more by increasing a connection threshold level when a level of propagation loss in said single mobile station changes rapidly, the connection threshold level being given by a function of a variation rate of a relative propagation loss; and selecting the radio base stations to be connected to so as to become less by decreasing the connection threshold level when the level of the propagation loss in said single mobile station changes slowly, thereby ensuring connection of the radio base station having a minimum propagation loss.

2. A method of setting a hysteresis margin in a single mobile station of a code division multiple access (CDMA) mobile radio communication system in which several radio base stations are simultaneously connected to said single mobile station, the hysteresis margin defining release connection of said radio base stations and the hysteresis margin being equal to a difference between a connection threshold level and a disconnection threshold level, said method comprising the steps of:

setting the hysteresis margin so as to become larger with the connection threshold level increased when a level of propagation loss in said single mobile station changes rapidly, increasing radio base stations simultaneously connected to said single mobile station, the connection threshold level being given by a function of a variation rate of a relative propagation loss; and setting the hysteresis margin so as to become smaller with the connection threshold level decreased when the level of the propagation loss in said signal mobile station changes slowly, decreasing radio base stations simultaneously connected to said single mobile station, thereby ensuring connection of the radio base station having a minimum propagation loss.

3. A method of selecting radio base stations in a single mobile station of a code division multiple access (CDMA) mobile radio communication system in which several radio base stations are simultaneously connected to said single mobile station, said method comprising the steps of:

determining, in said single mobile station, relative propagation losses for said radio base stations on the basis of a minimum propagation loss for said radio base stations;

calculating, in said single mobile station, variation rates of the relative propagation losses;

determining, in said single mobile station, whether of not said single mobile station is connected to each radio base station;

producing, in said single mobile station, determined result indicative of connection or disconnection for radio base station; and when the determined result indicates that a particular radio base station is not connected to said single mobile station and when the relative propagation loss for said particular radio base station is lower than a connection threshold level which is given by a function of the variation rate such that an increase in the variation rate causes the connection threshold level to increase, starting, in said single mobile station, connection of said mobile station of said particular radio base station, thereby ensuring connection of the radio base station having the minimum propagation loss.

4. A method as claimed in claim 3, wherein said method further comprises the step of maintaining a disconnection condition for said particular radio base station when the determined result indicates that said particular radio base station is not connected to said mobile station and when the relative propagation loss for said particular radio base station is not lower than the connection threshold level.

5. A method as claimed in claim 3, wherein said method further comprises the step of, when the determined result indicates that a specific radio base station is connected to said mobile station and when the relative propagation loss for said specific radio base station is higher than a disconnection threshold level which is obtained by adding a hysteresis margin to the connection threshold level, disconnecting of said mobile station to said specific radio base station.

6. A method as claimed in claim 5, wherein the hysteresis margin being given by the function of the variation rate as an argument, the faster the variation rate being, the larger the hysteresis margin being.

7. A method as claimed in claim 5, wherein said method further comprises the step of maintaining a connection condition for said specific radio base station when said determining result indicates that said specific radio base station is connected to said mobile station and when the relative propagation loss for said specific radio base station is not higher than the disconnection threshold level.

8. A method as claimed in claim 7, wherein the hysteresis margin being given by the function of the variation rate as an argument, the faster the variation rate being, the larger the hysteresis margin being.

9. A method of selecting radio base stations in a single mobile station of a code division multiple access (CDMA) mobile radio communication system in which several radio base stations are simultaneously connected to said single mobile station, said method comprising the steps of:

selecting the radio base stations to be connected so as to become more by increasing a connection threshold level when a moving speed of said single mobile station is fast, the connection threshold level being given by a function of the moving speed measured at said single mobile station; and selecting the radio base stations to be connected so as to become less by decreasing the connection threshold level when the moving speed of said single mobile station is slow, thereby ensuring connection of the radio base station having a minimum propagation loss.

10. A method of setting a hysteresis margin in a single mobile station of a code division multiple access (CDMA) mobile ratio communication system in which several radio base stations are simultaneously connected to said single mobile station, the hysteresis margin defining release from connection of said radio base stations and the hysteresis margin being equal to a difference between a connection threshold level and a disconnection threshold level, said method comprising the steps of:

setting the hysteresis margin so as to become larger with the connection threshold level increased when a moving speed of said mobile station is fast, increasing radio base stations simultaneously connected to said single mobile station, the connection threshold level being given by a function of the moving speed measured at said single mobile station; and setting the hysteresis margin so as to become smaller with the connection threshold level decreased when the moving speed of said mobile station is slow, decreasing radio base stations simultaneously connected to said single mobile station, thereby ensuring connection of the radio base station having a minimum propagation loss.

11. A method of selecting radio base stations in a single mobile station of a code division multiple access (CDMA) mobile radio communication system in which several radio base stations are simultaneously connected to said single mobile station, said method comprising the steps of:
- detecting, in said single mobile station, a moving speed of said single mobile station;
- determining, in said single mobile station, relative propagation losses for said radio base stations on the basis of a minimum propagation loss for said radio base stations;
- determining, in said single mobile station, whether or not said single mobile station is connected to each radio base station;
- producing, in said single mobile station, a determined result indicative of connection or disconnection for each radio base station; and
- when the determined result indicates that a particular radio base station is not connected to said mobile station and when the relative propagation loss for said particular radio base station is lower than a connection threshold level which is given by a function of the moving speed such that an increase in the moving speed causes the connection threshold level to increase, starting, in said single mobile station, connection of said mobile station of said particular radio base station,
- thereby ensuring connection of the radio base station having the minimum propagation loss.

12. A method as claimed in claim 11, wherein said method further comprises the step of maintaining a disconnection condition for said particular radio base station when the determined result indicates that said particular radio base station is not connected to said mobile station and when the relative propagation loss for said particular radio base station is not lower than the connection threshold level.

13. A method as claimed in claim 11, wherein said method further comprises the step of, when the determined result indicates that a specific radio base station is connected to said mobile station and when the relative propagation loss for said specific radio base station is higher than a disconnection threshold level which is obtained by adding a hysteresis margin to the connection threshold level, disconnecting of said mobile station to said specific radio base station.

14. A method as claimed in claim 13, wherein the hysteresis margin being given by the function of the moving speed as an argument, the faster the moving speed being, the larger the hysteresis margin being.

15. A method as claimed in claim 13, wherein said method further comprises the step of maintaining a connection condition for said specific radio base station when said determining result indicates that said specific radio base station is connected to said mobile station and when the relative propagation loss for said specific radio base station is not higher than the disconnection threshold level.

16. A method as claimed in claim 15, wherein the hysteresis margin being given by the function of the moving speed as an argument, the faster the moving speed being, the larger the hysteresis margin being.

17. A code division multiple access (CDMA) mobile radio communication system in which several radio base stations are simultaneously connected to a mobile station, said mobile station comprising:
- a propagation loss measurement unit for measuring a propagation loss from said mobile station to each of the radio base stations; and
- a soft handoff radio base station selection unit, connected to said propagation loss measurement unit, for determining the radio base stations to be connected or to be disconnected on the basis of the propagation loss with reference to a connection threshold level which is given by a function of a variation rate of a relative propagation loss, said soft handoff radio base station selection unit selecting the radio base stations to be connected so as to become more by increasing the connection threshold level when a level of the propagation loss changes rapidly, said soft handoff radio base station selection unit selecting the radio base stations to be connected so as to become less by decreasing the connection threshold level when the level of the propagation loss changes slowly,
- thereby ensuring connection of the radio base station having a minimum propagation loss.

18. A code division multiple access (CDMA) cellular type mobile radio communication system in which several radio base stations are simultaneously connected to a mobile station, said mobile station comprising:
- a propagation loss measurement unit for measuring a propagation loss from said mobile station to each of the radio base stations; and
- a soft handoff radio base station selection unit, connected to said propagation loss measurement unit, for determining the radio base stations to be connected or to be connected on the basis of the propagation loss with reference to a connection threshold level and a disconnection threshold level which is higher than the connection threshold level by a hysteresis margin,
- wherein said soft handoff radio base station selection unit increasing the hysteresis margin with the connection threshold level increased when a level of the propagation loss changes rapidly, increasing radio base stations simultaneously connected to said mobile station, the connection threshold level being given by a function at a variation rate of a relative propagation loss, and
- wherein said soft handoff radio base station selection unit decreases the hysteresis margin with the connection threshold level decreased when the level of the propagation loss changes slowly,
- thereby ensuring connection of the radio base station having a minimum propagation loss.

19. A code division multiple access (CDMA) mobile radio communication system in which several radio base stations are simultaneously connected to a mobile station, said mobile station comprising:
- a propagation loss measurement unit for measuring a propagation loss from said mobile station to each of the radio base stations; and
- a soft handoff radio base station selection unit, connected to said propagation loss measurement unit, for determining the radio base stations to be connected or to be disconnected on the basis of the propagation loss with reference to a connection threshold level and a disconnection threshold level which is higher than the connection threshold level by a hysteresis margin;
- said soft handoff radio base station selection unit comprising:
  - means for determining relative propagation losses for said radio base stations on the basis of a minimum propagation loss for said radio base stations;
  - calculation means for calculating variation rates of the relative propagation losses;
  - determining means for determining whether or not said mobile station is connected to each radio base station to produce determined result indicative of connection or disconnection for radio base station; and connection starting means, when the determined result indicates that a particular radio base station is not connected to said mobile station and when the relative propagation loss for said particular radio base station is lower than a connection threshold level which is given by a function of the variation rate such that an increase in the variation rate causes the connection threshold level to increase, for starting connection of said mobile station to said particular radio base station, thereby ensuring connection of the radio base station having the minimum propagation loss.

20. A CDMA mobile radio communication system as claimed in claim 19, wherein said soft handoff radio base station selection unit further comprises means for maintaining a disconnection condition for said particular radio base station when the determined result indicates that said particular radio base station is not connected to said mobile station and when the relative propagation loss for said particular radio base station is not lower than the connection threshold level.

21. A CDMA mobile radio communication system as claimed in claim 19, wherein said soft handoff radio base station selection unit further comprises disconnecting means, when the determined result indicates that a specific radio base station is connected to said mobile station and when the relative propagation loss for said specific radio base station is higher than the disconnection threshold level, disconnecting said mobile station from said specific radio base station.

22. A CDMA mobile radio communication system as claimed in claim 21, wherein the connection threshold level is given by the function of the variation rate as an argument, the faster the variation rate being, the higher the connection threshold level being, the hysteresis margin being given by the function of the variation rate as an argument, the faster the variation rate being, the larger the hysteresis margin being.

23. A CDMA mobile radio communication system as claimed in claim 21, wherein said soft handoff radio base station selection unit further comprises means for maintaining a connection condition for said specific radio base station when said determining result indicates that said specific radio base station is connected to said mobile station and when the relative propagation loss for said specific radio base station is not higher than the disconnection threshold level.

24. A CDMA mobile radio communication system as claimed in claim 23, wherein the hysteresis margin being given by the function of the variation rate as an argument, the faster the variation rate being, the larger the hysteresis margin being.

25. A code division multiple access (CDMA) mobile radio communication system in which several radio base stations are simultaneously connected to a mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level which is given by a function of the moving speed, said soft handoff radio base station selection unit selecting the radio base stations to be connected so as to become more by increasing the connection threshold level when the moving speed is fast, said soft handoff radio base station selection unit selecting the radio base stations to be connected so as to become less by decreasing the connection threshold level when the moving speed is slow, thereby ensuring connection of the radio base station having a minimum propagation loss.

26. A code division multiple access (CDMA) mobile radio communication system in which several radio base stations are simultaneously connected to a mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level and a disconnection threshold level which is higher than the connection threshold level by a hysteresis margin, wherein said soft handoff radio base station selection unit increases the hysteresis margin with the connection threshold level increased when the moving speed is fast, increasing radio base stations simultaneously connected to said mobile station, the connection threshold level being given by a function of the moving speed, and wherein said soft handoff radio base station selection unit decreases the hysteresis margin with the connection threshold level decreased when the moving speed is slow, decreasing radio base stations simultaneously connected to said mobile station, thereby ensuring connection of the radio base station having a minimum propagation loss.

27. A code division multiple access (CDMA) mobile radio communication system in which several radio base stations are simultaneously connected to a mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level and a disconnection threshold level which is higher than the connection threshold level by a hysteresis margin;

said soft handoff radio base station selection unit comprising:

means for determining relative propagation losses for said radio base stations on the basis of a minimum propagation loss for said radio base stations;

determining means for determining whether or not said mobile station is connected to each radio base station;

means for producing a determined result indicative of connection or disconnection for radio base station; and connection starting means, when the determined result indicates that a particular radio base station is not connected to said mobile station and when the relative propagation loss for said particular radio base station is lower than a connection threshold level which is given by a function of the moving speed such that an increase in the moving speed causes the connection level to increase, for starting connection of said mobile station to said particular radio base station, thereby ensuring connection of the radio base station having the minimum propagation loss.

28. A CDMA mobile radio communication system as claimed in claim 27, wherein said soft handoff radio base station selection unit further comprises means for maintaining a disconnection condition for said particular radio base station when the determined result indicates that said particular radio base station is not connected to said mobile station and when the relative propagation loss for said particular radio base station is not lower than the connection threshold level.

29. A CDMA mobile radio communication system as claimed in claim 27, wherein said soft handoff radio base station selection unit further comprises disconnecting means, when the determined result indicates that a specific radio base station is connected to said mobile station and when the relative propagation loss for said specific radio base station is higher than the disconnection threshold level, disconnecting said mobile station from said specific radio base station.

30. A CDMA mobile radio communication system as claimed in claim 29, wherein the hysteresis margin being given by the function of the moving speed as an argument, the faster the moving speed being, the larger the hysteresis margin being.

31. A CDMA mobile radio communication system as claimed in claim 29, wherein said soft handoff radio base station selection unit further comprises means for maintaining a connection condition for said specific radio base station when said determining result indicates that said specific radio base station is connected to said mobile station and when the relative propagation loss for said specific radio base station is not higher than the disconnection threshold level.

32. A CDMA mobile radio communication system as claimed in claim 31, wherein the hysteresis margin being given by the function of the moving speed as an argument, the faster the moving speed being, the larger the hysteresis margin being.

33. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations; and a soft handoff radio base station selection unit, connected to said propagation loss measurement unit, for determining the radio base stations to be connected or to be disconnected on the basis of the propagation loss with reference to a connection threshold level which in given by a function of a variation rata of a relative propagation loss, said soft handoff radio base station selection unit selecting the radio base stations to be connected so as to become more by increasing the connection threshold level when a level of the propagation loss changes rapidly, said soft handoff radio base station selection unit selecting the radio base stations to be connected so as to become less by decreasing the connection threshold level when the level of the propagation loss changes slowly, thereby ensuring connection of the radio base station having a minimum propagation loss.

34. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations; and a soft handoff radio base station selection unit, connected to said propagation loss measurement unit, for determining the radio base stations to be connected or to be disconnected on the basis of the propagation loss with reference to a connection threshold level and a disconnection threshold level which is higher than the connection threshold level by a hysteresis margin, wherein said soft handoff radio base station selection unit increases the hysteresis margin with the connection threshold level increased when a level of the propagation loss changes rapidly, increasing radio base stations simultaneously connected to said mobile stations, the connection threshold level being given by a function of a variation rate of a relative propagation loss, and wherein said soft handoff radio base station selection unit decreases the hysteresis margin with the connection threshold level decreased when the level of the propagation loss changes slowly, decreasing radio base stations simultaneously connected to said mobile station, thereby ensuring connection of the radio base station having a minimum propagation loss.

35. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations; and a soft handoff radio base station selection unit, connected to said propagation loss measurement unit, for determining the radio base stations to be connected or to be disconnected on the basis of the propagation loss with reference to a connection threshold level and a disconnection threshold level which is higher than the connection threshold level by a hysteresis margin;

said soft handoff radio base station selection unit comprising:

means for determining relative propagation losses for said radio base stations on the basis of a minimum propagation loss for said radio base stations;

calculation means for calculating variation rates of the relative propagation losses;

determining means for determining whether or not said mobile station is connected to each radio base station;

means for producing determined result indicative of connection or disconnection for radio base station; and connection starting means, when the determined result indicates that a particular radio base station is not connected to said mobile station and when the relative propagation loss for said particular radio base station is lower than the connection threshold level which is given by a function of the variation rate such that an increase in the variation rate causes the connection threshold level to increase, for starting connection of said mobile station to said particular radio base station, thereby ensuring connection of the radio base station having the minimum propagation loss.

36. A mobile station as claimed in claim 35, wherein said soft handoff radio base station selection unit further comprises means for maintaining a disconnection condition for said particular radio base station when the determined result indicates that said particular radio base station is not connected to said mobile station and when the relative propagation loss for said particular radio base station is not lower than the connection threshold level.

37. A mobile station as claimed in claim 35, wherein said soft handoff radio base station selection unit further comprises disconnecting means, when the determined result indicates that a specific radio base station is connected to said mobile station and when the relative propagation loss for said specific radio base station is higher than the disconnection threshold level, disconnecting said mobile station from said specific radio base station.

38. A mobile station as claimed in claim 37, wherein the hysteresis margin being given by the function of the variation rate as an argument, the faster the variation rate being, the larger the hysteresis margin being.

39. A mobile station as claimed in claim 37, wherein said soft handoff radio base station selection unit further comprises means for maintaining a connection condition for said specific radio base station when said determining result indicates that said specific radio base station is connected to said mobile station and when the relative propagation loss for said specific radio base station is not higher than the disconnection threshold level.

40. A mobile station as claimed in claim 39, wherein the hysteresis margin being given by the function of the variation rate as an argument, the faster the variation rate being, the larger the hysteresis margin being.

41. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level which is given by a function of the moving speed, said soft handoff radio base station selection unit selecting the radio base stations to be connected so as to become more by increasing the connection threshold level when the moving speed is fast, said soft handoff radio base station selection unit selecting the radio base stations to be connected so as to become less by decreasing the connection threshold level when the moving speed is slow, thereby ensuring connection of the radio base station having a minimum propagation loss.

42. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level and a disconnection threshold level which is higher than the connection, threshold level by a hysteresis margin, wherein said soft handoff radio base station selection unit increases the hysteresis margin with the connection threshold level increased when the moving speed is fast, increasing radio base stations simultaneously connected to said mobile station, the connection threshold level being given by a function of the moving speed, and wherein said soft handoff radio base station selection unit decreases the hysteresis margin with the connection threshold level decreased when the moving speed is slow, decreasing radio base stations simultaneously connected to said mobile station, thereby ensuring connection of the radio base station having a minimum propagation loss.

43. A mobile station for use in a code division multiple access (CDMA) mobile radio communication system in which several radio base stations are simultaneously connected to said mobile station, said mobile station comprising:

a propagation loss measurement unit for measuring a propagation loss from said mobile station to each of the radio base stations;

a moving speed detection unit for detecting a moving speed of said mobile station; and a soft handoff radio base station selection unit, connected to said propagation loss measurement unit and said moving speed detection unit, for determining the radio base stations to be connected or to be disconnected on the basis of the propagation loss with reference to a connection threshold level and a disconnection threshold level which is higher than the connection threshold level by a hysteresis margin;

said soft handoff radio base station selection unit comprising:

means for determining relative propagation losses for said radio base stations on the basis of a minimum propagation loss for said radio base stations;

determining means for determining whether or not said mobile station is connected to each radio base station to produce a determined result indicative of connection or disconnection for radio base station; and connection starting means, when the determined result indicates that a particular radio base station is not connected to said mobile station and when the relative propagation loss for said particular radio base station is lower than the connection threshold level which is given by a function of the moving speed such that an increase in the moving speed causes the connection threshold level to increase, for starting connection of said mobile station of said particular radio base station, thereby ensuring connection of the radio base station having the minimum propagation loss.

44. A mobile station as claimed in claim 43, wherein said soft handoff radio base station selection unit further comprises means for maintaining a disconnection condition for said particular radio base station when the determined result indicates that said particular radio base station is not connected to said mobile station and when the relative propagation loss for said particular radio base station is not lower than the connection threshold level.

45. A mobile station as claimed in claim 43, wherein said soft handoff radio base station selection unit further comprises disconnecting means, when the determined result indicates that a specific radio base station is connected to said mobile station and when the relative propagation loss for said specific radio base station is higher than the disconnection threshold level, disconnecting said mobile station from said specific radio base station.

46. A mobile station as claimed in claim 45, wherein the hysteresis margin being given by the function of the moving speed as an argument, the faster the moving speed being, the larger the hysteresis margin being.

47. A mobile station as claimed in claim 45, wherein said soft handoff radio base station selection unit further comprises means for maintaining a connection condition for said specific radio base station when said determining result indicates that said specific radio base station is connected to said mobile station and when the relative propagation loss for said specific radio base station is not higher than the disconnection threshold level.

48. A mobile station as claimed in claim 47, wherein the hysteresis margin being given by the function of the moving speed as an argument, the faster the moving speed being, the larger the hysteresis margin being.

* * * * *